United States Patent
Hawkins, III et al.

(10) Patent No.: US 12,429,921 B2
(45) Date of Patent: Sep. 30, 2025

(54) COVER SYSTEM FOR COMPUTING DEVICE PORTS

(71) Applicant: Wahoo Fitness LLC, Atlanta, GA (US)

(72) Inventors: Harold M. Hawkins, III, Atlanta, GA (US); William A. Hammond, Atlanta, GA (US); Shane A. Byler, Mableton, GA (US); Edward F. Hicks, Sleepy Hollow, IL (US); William C. Phelps, III, Lawrenceville, GA (US)

(73) Assignee: Wahoo Fitness LLC, Atlanta, GA (US)

( * ) Notice: Subject to any disclaimer, the term of this patent is extended or adjusted under 35 U.S.C. 154(b) by 730 days.

(21) Appl. No.: 17/726,345

(22) Filed: Apr. 21, 2022

(65) Prior Publication Data
US 2022/0342452 A1 Oct. 27, 2022

Related U.S. Application Data

(60) Provisional application No. 63/179,095, filed on Apr. 23, 2021.

(51) Int. Cl.
*G06F 1/16* (2006.01)
*B62J 23/00* (2006.01)
*B62J 45/20* (2020.01)

(52) U.S. Cl.
CPC ............ *G06F 1/1656* (2013.01); *B62J 23/00* (2013.01); *B62J 45/20* (2020.02)

(58) Field of Classification Search
CPC .... G06F 1/1656; G06F 1/1626; G06F 1/1632; B62J 23/00; B62J 45/20; B62J 50/22; B62J 50/225
See application file for complete search history.

(56) References Cited

U.S. PATENT DOCUMENTS

| | | | |
|---|---|---|---|
| 6,227,068 B1 | 5/2001 | Masui | |
| 6,305,241 B1 | 10/2001 | Masui | |
| 6,584,872 B1 | 7/2003 | Kojima | |
| 6,774,771 B2 | 8/2004 | Takeda | |
| 7,035,110 B1* | 4/2006 | Wang | H05K 5/0278 361/752 |
| 8,014,133 B2* | 9/2011 | Dong | H04M 1/0202 361/679.01 |
| 8,238,087 B2* | 8/2012 | McClure | H05K 1/0281 292/196 |
| 9,402,016 B1 | 7/2016 | Hidalgo | |
| 9,629,273 B2* | 4/2017 | Ogawa | H05K 7/14 |
| 10,409,334 B1* | 9/2019 | Kitamura | G06F 1/1662 |
| 11,029,734 B2 | 6/2021 | Hawkins, III et al. | |

(Continued)

*Primary Examiner* — Rockshana D Chowdhury
(74) *Attorney, Agent, or Firm* — Polsinelli PC; Gregory P. Durbin

(57) ABSTRACT

A cover system for a housing, such as a computing device housing, includes a channel defined by a housing and including each of a first opening and a second opening. The channel includes a first portion and a second portion separated by an aperture. During use, a protrusion of a cover is inserted through the aperture from the first portion of the channel into the second portion of the channel. The tip and aperture are sized such that the aperture retains the tip in the second portion of the channel after insertion. In the event the tip breaks off of the protrusion within the channel, each of the second portion and the second opening are sized and shaped to permit rapid removal of the tip from within the channel.

17 Claims, 7 Drawing Sheets

(56) References Cited

U.S. PATENT DOCUMENTS

| | | | |
|---|---|---|---|
| 11,972,911 B2* | 4/2024 | Choi | H01H 13/14 |
| 12,064,585 B2* | 8/2024 | Stumpe | A61M 5/1413 |
| 2005/0180150 A1 | 8/2005 | Okada | |
| 2010/0181450 A1* | 7/2010 | Hulick | F16B 45/036 |
| | | | 248/229.2 |
| 2010/0246199 A1 | 9/2010 | Ma et al. | |
| 2011/0228455 A1* | 9/2011 | Dong | H05K 5/023 |
| | | | 361/679.01 |
| 2011/0299237 A1* | 12/2011 | Liang | G11B 33/128 |
| | | | 361/679.38 |
| 2013/0044420 A1* | 2/2013 | Iwamoto | G06F 1/182 |
| | | | 361/679.01 |
| 2013/0044439 A1* | 2/2013 | Guo | G06F 1/181 |
| | | | 361/747 |
| 2013/0098959 A1 | 4/2013 | Onogi | |
| 2013/0134848 A1* | 5/2013 | Chu | F16B 21/073 |
| | | | 312/265 |
| 2014/0307393 A1* | 10/2014 | Park | G06F 1/1656 |
| | | | 361/727 |
| 2015/0183478 A1 | 7/2015 | Tate et al. | |
| 2015/0282364 A1* | 10/2015 | Moon | H04M 1/18 |
| | | | 174/50.51 |
| 2015/0338883 A1* | 11/2015 | Farahani | G06F 3/03547 |
| | | | 361/679.1 |
| 2020/0387199 A1* | 12/2020 | Kinoshita | G06F 1/1616 |
| 2021/0034115 A1* | 2/2021 | Pichumani | G06F 1/1637 |
| 2021/0089087 A1* | 3/2021 | Yamamoto | G06F 1/1626 |

* cited by examiner

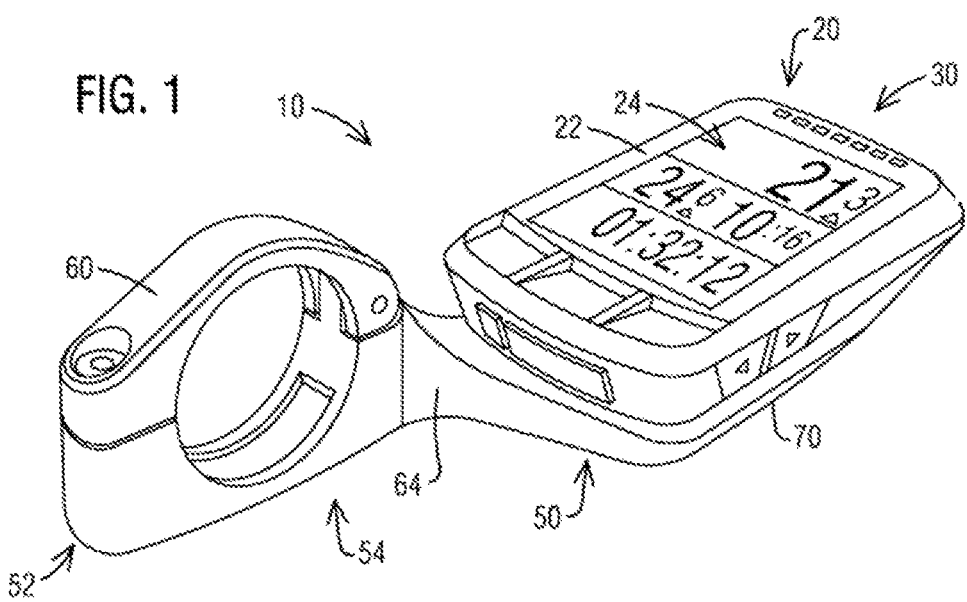
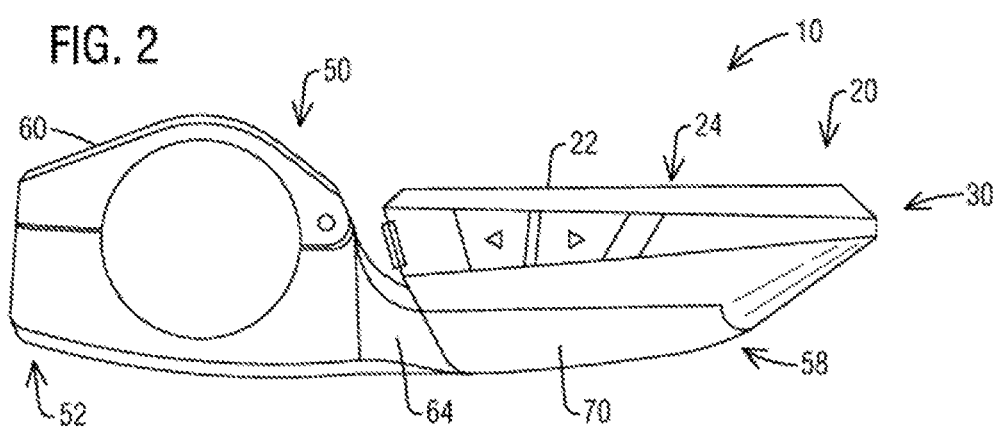
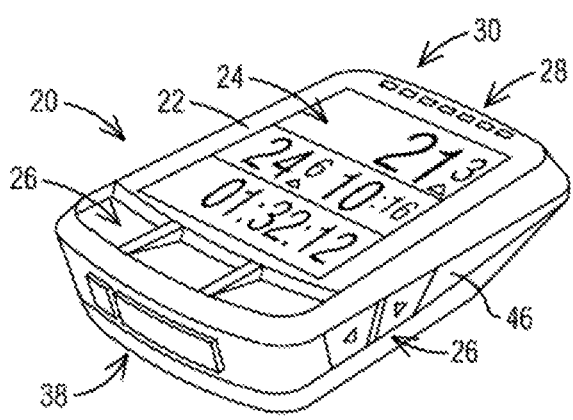

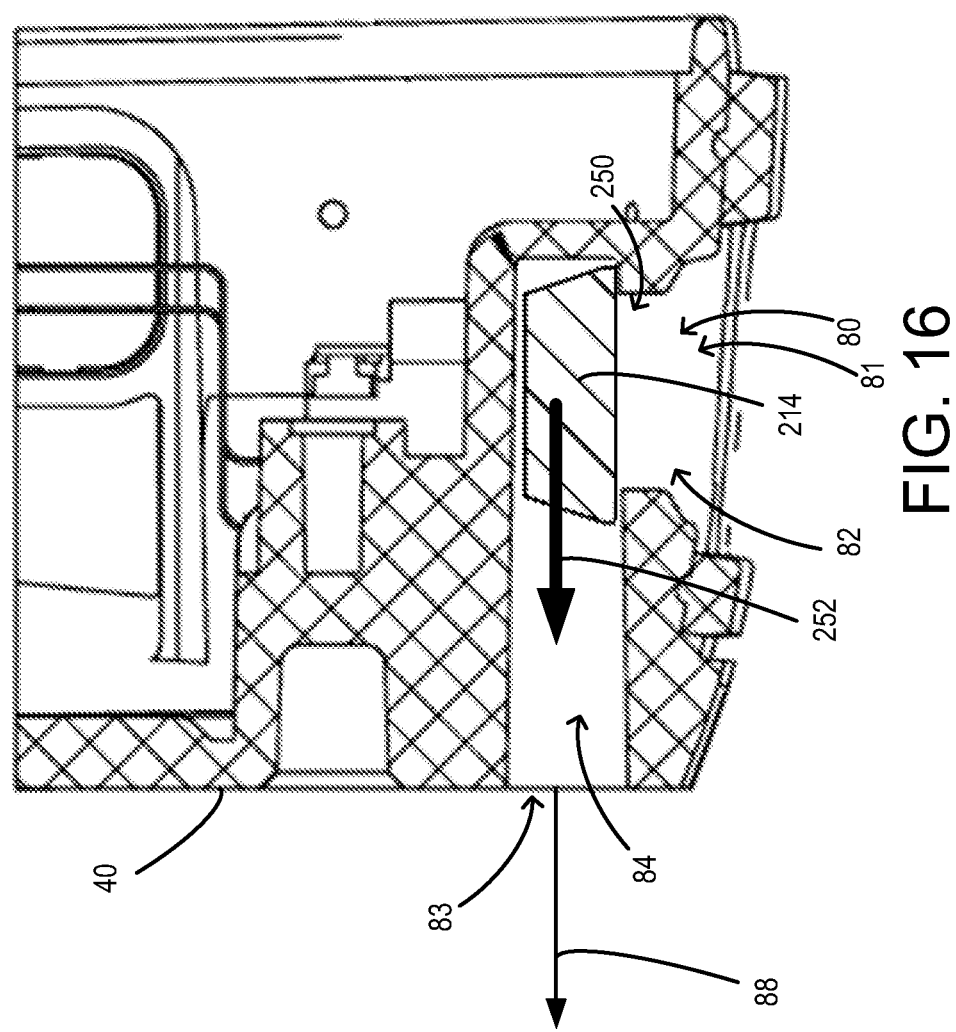

COVER SYSTEM FOR COMPUTING DEVICE PORTS

CROSS-REFERENCE TO RELATED APPLICATION

This application is related to and claims priority under 35 U.S.C. § 119 from U.S. Provisional Application No. 63/179,095, filed Apr. 23, 2021, titled "Cover System for Computer Device Ports," the entire contents of which are fully incorporated by reference herein for all purposes.

TECHNICAL FIELD

The present disclosure relates to cover systems and, in particular, cover systems for openings in computing device housings and similar devices.

BACKGROUND

Computing devices include many electronic components that are highly susceptible to dust, liquids, and other substances. Such susceptibility is particularly a concern for computing devices intended for rugged applications, such as cycling computers, where exposure to dirt, mud, and water is inevitable. Although device designers limit potential ingress points for devices, many devices require ports for communication, charging, and similar functions. As a result, computing devices may include caps, flaps, or similar covers that enable access to the ports when necessary and that seal or otherwise protect the ports when the ports are not in use. Regular use of a cover (e.g., regular insertion and removal from the port) can lead to wear and failure of the cover. In many conventional devices, covers can be difficult or impossible to repair, resulting in increased risk that the port may be damaged by foreign substances or that the port may provide an ingress point for foreign substances that may cause damage to internal components of the computing device.

SUMMARY

One aspect of the present disclosure includes a computing device with a housing. The housing defines a compartment containing electronic components. The housing further includes a channel extending through the housing and isolated from the compartment. The channel includes each of a first portion, a second portion including an opening to an exterior of the housing, and an aperture between the first portion and the second portion. The channel is shaped to receive a protrusion of a cover through the first portion to couple the cover to the housing. When the protrusion is received by the channel, a tip of the protrusion is disposed within the second portion and retained by the aperture, and, when the tip is decoupled from the protrusion, the opening permits access to and removal of the tip from the second portion.

In certain implementations, the opening defines a normal and the opening has a shape that encompasses maximum cross-sectional dimensions of the tip perpendicular to the normal.

In other implementations, the computing device includes the cover.

In other implementations, the electronic components include a port extending from the compartment, through a wall of the housing, and to an exterior of the housing. In such implementations, the cover may form a waterproof seal about the port when the cover is coupled to the housing and the port may be a Universal Serial Bus (USB) port.

In still other implementations, the first portion includes a first opening defined by the housing and the opening through which the tip is removable is a second opening defined by the housing. In such implementations, the first opening may be oriented perpendicular to the second opening.

In yet other implementations, the housing further defines a compartment opening extending from the compartment to an exterior of the housing. In such implementations, the compartment opening may be covered by the cover when the cover is coupled to the housing and the housing may further define one of a recess and a channel disposed on an opposite side of the compartment opening from the channel.

Another aspect of the present disclosure includes a housing including a housing body. The housing body defines a compartment and a channel extending through the housing body and isolated from the compartment. The channel includes each of a first portion, a second portion including an opening to an exterior of the housing, and an aperture between the first portion and the second portion. The channel is shaped to receive a protrusion of a cover through the first portion to couple the cover to the housing body. When the protrusion is received by the channel, a tip of the protrusion is disposed within the second portion and retained by the aperture, and when the tip is decoupled from the protrusion, the opening permits access to and removal of the tip from the second portion.

In certain implementations, the opening defines a normal and the opening has a shape that encompasses maximum cross-sectional dimensions of the tip perpendicular to the normal.

In other implementations, the housing further includes the cover.

In still other implementations the first portion includes a first opening defined by the housing and the opening through which the tip is removable is a second opening defined by the housing. In such implementations, the first opening is oriented perpendicular to the second opening.

In yet another implementation, the housing further defines one of a recess and a channel disposed on an opposite side of the opening from the channel.

Yet another aspect of this disclosure includes a cycling computer with a housing. The housing defines a compartment and a channel extending through the housing and isolated from the compartment. The channel includes each of a first portion, a second portion including an opening to an exterior of the housing, and an aperture between the first portion and the second portion. A computing device disposed within the housing includes a port extending through a port opening defined by the housing to an exterior of the housing. The channel is shaped to receive a protrusion of a cover through the first portion to couple the cover to the housing. When the protrusion is received by the channel, a tip of the protrusion is disposed within the second portion and retained by the aperture. When the tip is decoupled from the protrusion, the opening permits access to and removal of the tip from the second portion.

In certain implementations, the opening defines a normal and has a shape that encompasses maximum cross-sectional dimensions of the tip perpendicular to the normal.

In other implementations the cycling computer includes the cover.

In still other implementations, when the cover is coupled to the housing, the cover forms a waterproof seal about the port opening.

In other implementations, the port is a Universal Serial Bus (USB) port.

In other implementations, the first portion includes a first opening defined by the housing and the opening through which the tip is removable is a second opening defined by the housing such that the first opening is oriented perpendicular to the second opening.

In another implementation, the cycling computer further includes a display on a first side of the housing and the opening is disposed on a second side of the housing opposite the first side.

In yet another implementation, the housing further defines one of a recess and a channel disposed on an opposite side of the port opening from the channel.

BRIEF DESCRIPTION OF THE DRAWINGS

The figures and drawings provide example embodiments of this disclosure. The embodiments disclosed should be considered illustrative rather than limiting.

FIG. 1 is a rear topside perspective view of a cycling computer, in accordance with a representative embodiment of the present disclosure.

FIG. 2 is a side view of the cycling computer of FIG. 1.

FIG. 3 is a rear topside perspective view of the isolated computer housing for the cycling computer of FIG. 1.

FIG. 16 is a partial cross-sectional view of the computer housing of FIG. 3 illustrating removal of a protrusion tip from within a retention channel.

Figure 4:
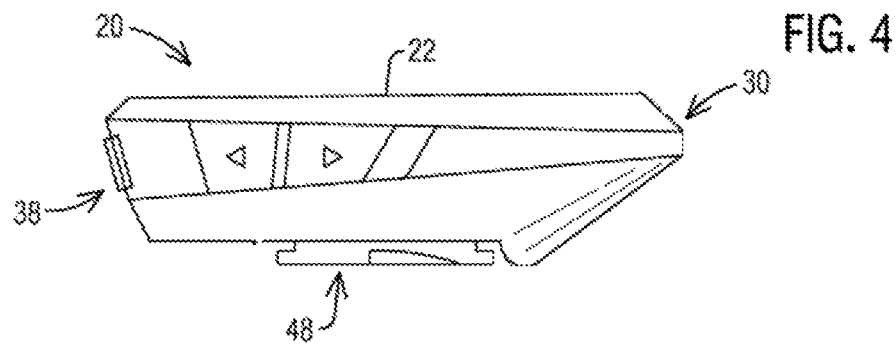
FIG. 4 is a side view of the computer housing of FIG. 3.

Those skilled in the art will appreciate and understand that, according to common practice, various features and elements of the drawings described above are not necessarily drawn to scale, and that the dimensions of the various features and elements may be expanded or reduced to more clearly illustrate the embodiments of the present disclosure described therein.

DETAILED DESCRIPTION

This disclosure provides enabling teachings of exemplary embodiments of a cover system that may be used for ports or other openings defined in containers and housings, such as computing device housings. Although this disclosure relies primarily on a cycling computer as an example computing device within which the cover system may be integrated, it should be understood that the cover system is more broadly applicable to any computing device and, in particular, computing devices that may benefit from a waterproof or similar cover, e.g., to protect a port of the computing device or to otherwise prevent ingress of unwanted fluid and debris into a port or housing of the device, which may include computing elements that may be damaged from water ingress. For example, computing devices such as smartphones, tablet computers, laptop computers, and the like may incorporate aspects of this disclosure, particularly when such computing devices are for use in environments or for applications requiring water or other ingress protection. Even more generally, the cover system described herein may be implemented into any suitable housing or container structure, regardless of the contents of the housing or container structure or intended application. Accordingly, to the extent the cover system is described herein in the context of a cycling computer, embodiments of the present disclosure are not limited to cycling computer applications.

The disclosed cover system may be implemented to provide a waterproof or similar seal or cover for a port or other opening of a housing. Cycling computers, for example, may include a housing defining one or more openings or ports. One example is a peripheral port (e.g., a Universal Serial Bus (USB) port) that facilitates charging, data transfer, and other functions of the cycling computer. Such ports may provide access to and include sensitive electronic components/connections and/or provide a potential ingress point for dirt, fluid, debris, etc. To protect the various components of the cycling computer ports and other ingress points of a cycling computer may be covered and/or sealed when not in use, such as during a ride.

In certain applications, housing openings may be covered/sealed by a cover that includes a body and protrusions extending from the body. To cover the port, a user may insert the protrusions into corresponding receptacles of the housing such that the cover extends over the port and, in certain cases, seals the port. To uncover the port for access, the user may remove one or more of the protrusions from its corresponding receptacle, thereby allowing the cover to be removed, rotated, bent, or otherwise moved out of the way to expose the opening.

With repeated insertion and removal, the protrusions of the cover may become weakened and, in some cases, break off or otherwise decouple from the body of the cover. In some cases, the broken protrusion may become lodged within the receptacle for the protrusion and may require removal before a user can install a new cover. Depending on the design of the housing, removal of the broken protrusion may require disassembly of the housing. In certain cases, the broken protrusion may not be removable from its receptacle and, as a result, may preclude use of a new cover without first replacing some or all of the housing. Regardless, broken protrusions that become lodged within their receptacles are often a time-consuming and costly issue to fix and, if not fixed such that the corresponding port is exposed, the risk that dust, fluids, and debris may enter and damage the device is increased.

To address the foregoing issues, among others, aspects of the present disclosure are directed to an improved cover system for a housing that facilitates removal of cover protrusions that may break or otherwise decouple from a cover and become lodged within a receptacle of the housing. Housings according to this disclosure define each of a primary compartment and a channel extending through the housing that is separate from the primary compartment. The primary compartment may, for example, house electronic components and may be in communication with an exterior of the housing through an opening in the housing, such as an opening for accommodating a peripheral port. A cover may be inserted or repositioned over the opening to protect the opening. When the cover is installed, receptacles of the housing receive and retain protrusions of the cover with at least one of the receptacles corresponding to the channel defined through the housing.

The channel includes two distinct portions separated by an aperture, with each portion being accessible by a respective opening to an exterior of the housing. More specifically, the channel includes a first opening that is sized and shaped to allow insertion of the protrusion through the first opening. During insertion, a tapered or similarly shaped tip portion of the protrusion is inserted through the aperture and subsequently retained within the second portion of the channel by the aperture due to the tapered tip having a base or that exceeds the dimensions of the aperture. The housing further defines a second opening in communication with the second portion of the channel to facilitate removal of the tip portion in the event the tip portion breaks off of the protrusion and becomes disposed within the channel. Accordingly, the second opening and the second portion of the channel are generally sized and shaped to allow access to and/or removal of the disassociated tip.

Referring now in more detail to the drawing figures, wherein like parts are identified with like reference numerals throughout the several views, FIGS. 1-9 illustrate one embodiment of a cycling computer 10. As noted above, the cycling computer 10 is provided as just one example computing device within which the cover system disclosed herein may be integrated. The cover system may be used with other cycling computers having substantially different configurations other than the inclusion of a corresponding cover. Also, applications and embodiments of the present disclosure are not limited to cycling computers and more generally include any housing or container including a cover regardless of the contents of the housing or container. Although not limited to computing device housings, the cover system disclosed is particularly beneficial in such housings given the general sensitivity of computing devices to dust, fluids, debris, etc.

The cycling computer 10 includes a computer housing 20 for enclosing and protecting an electronics package of the bicycling computer. The computer housing 20 generally includes an electronic display 24 formed into a top surface 22 of the computer housing 20. The cycling computer 10 further includes a computer mount 50, such as "out front" mount 54, which includes a mounting adapter 60 at a proximal end 52 for coupling to the front of a bicycle (e.g., to handlebars of the bicycle), a substantially horizontal cradle 70 at a distal end 58 for removably receiving the computer housing 20, and a bracket arm 64 extending between the mounting adapter 60 and the cradle 70. The bottom surface of the computer housing 20 can be removably received within or attached to the top of the cradle 70 to secure the computer housing 20 in a locked and "in-use" position within the cradle, with a front end 30 extending forwardly from the distal end 58 of the computer mount, and out in front of handlebars of the bicycle. As further shown in more detail in FIGS. 3-9, the computer housing 20 can further include push buttons 26 formed into the top surface 22 and side surfaces 46 that allow for adjustment of the display, as well as a number of LED indicators 28 that may be used to convey additional useful information to the rider. The display may also be a touch screen display.

As discussed below in further detail, the computer housing 20 may include one or more ports for connecting the cycling computer 10 to a power source, a computing device, headphones, or other external elements. In the embodiment illustrated in FIGS. 1-9 and as discussed below in further detail, a port may be disposed on a back end 38 of the computer housing 20. An example of a port 106 can be seen in FIG. 10, which is discussed below in further detail.

Figure 5:
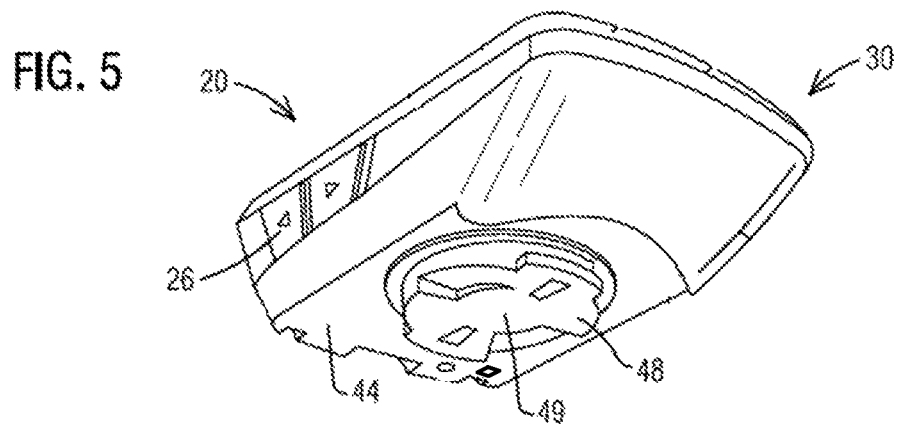
FIG. 5 is a front underside perspective view of the computer housing of FIG. 3.
Figure 6:
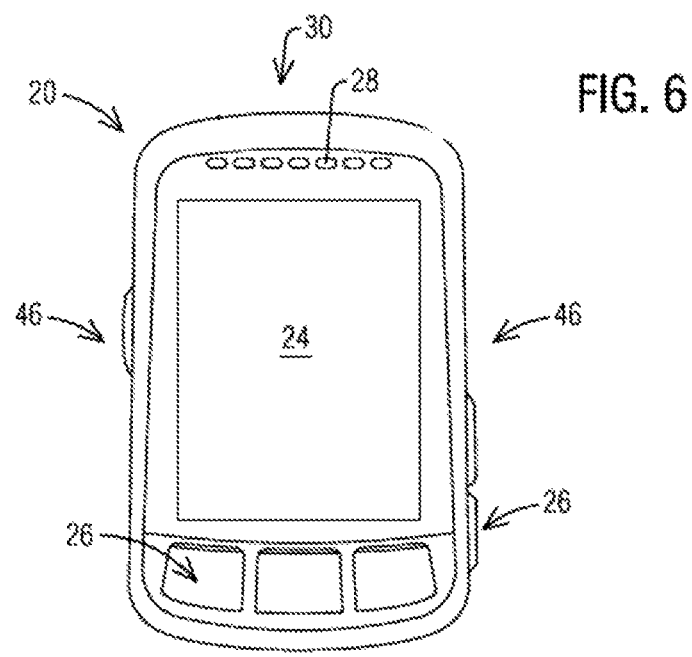
FIG. 6 is a top view of the computer housing of FIG. 3.
Figure 7:
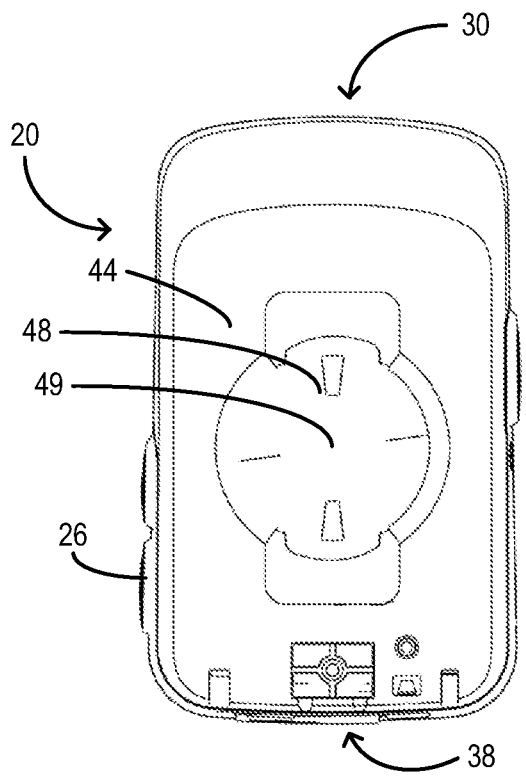
FIG. 7 is a bottom view of the computer housing of FIG. 3.
Figure 8:
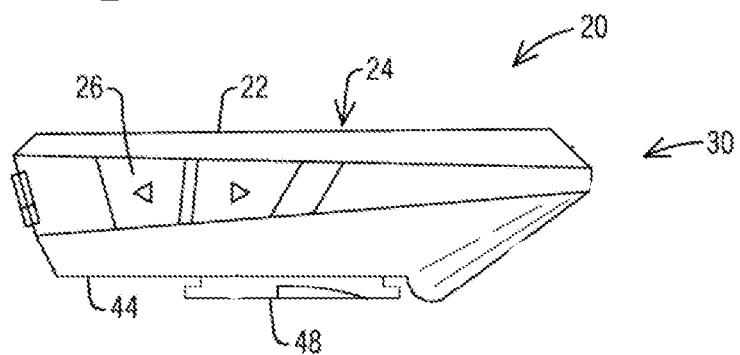
FIG. 8 is another side view of the computer housing of FIG. 3.
Figure 9:
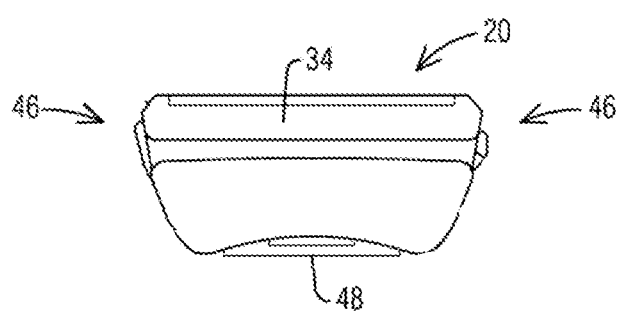
FIG. 9 is a front end view of the computer housing of FIG. 3.

As shown in FIGS. 4, 5, and 8, in at least certain embodiments, the cycling computer 10 may include a first coupling member 48 that is formed with and/or extends downward from a bottom surface 44 of the housing 20. The first coupling member 48 can be configured to engage a second coupling member formed into a top side or surface of the cradle 70 to removably secure the computer housing 20 to the cradle 70 of the computer mount 50. For example, the two coupling members can form a rotary-type attachment system in which the first coupling member 48 rotatably engages with the second coupling member by pivoting around an axis of rotation located at the center point 49 of the first coupling member 48.

Figure 10:
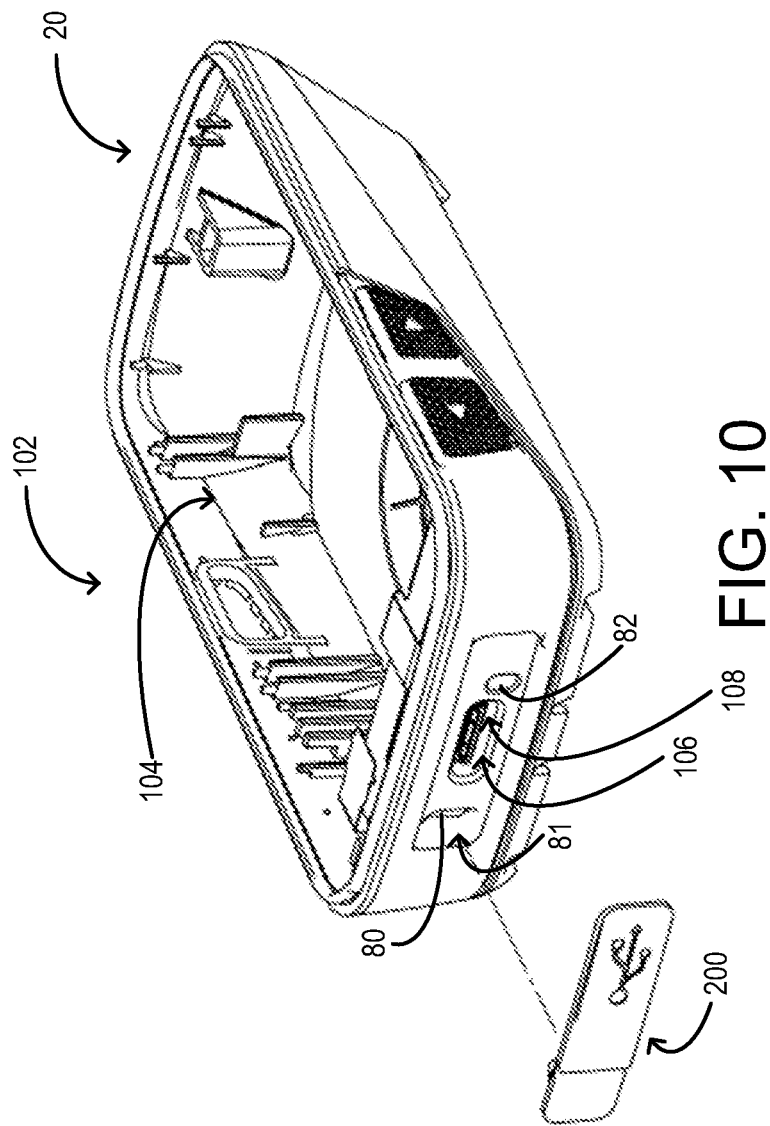
FIG. 10 is a rear topside perspective view of a bottom portion of housing of FIG. 3.

FIG. 10 is a rear topside perspective view of the housing 20 in a partially disassembled state and, more specifically, a bottom portion 102 of the housing 20. As illustrated, the housing 20 generally defines a compartment 104 within which various electronic components may be disposed. As noted above, in at least certain embodiments, cycling computers according to this disclosure may include one or more ports, such as port 106, or similar openings. Such ports may be used, for example, to couple the cycling computer to external power sources or to interface with other devices. In the specific embodiment illustrated in FIG. 10, the port 106 is a Universal Serial Bus (USB) port; however, in other embodiments, the port 106 may be any suitable port (e.g., for inter-device communication, charging, audio output, or any other function) currently known or later developed. Non-limiting examples of ports include USB ports (including any standard, mini-, or micro-style USB ports for any version of USB); FireWire ports; Thunderbolt ports; audio ports; microphone ports; HDMI, DVI, or other video-related ports; Ethernet or other network communication ports; serial ports; parallel ports; PS/2 or other peripheral ports; and power connections. More generally, the port 106 may correspond to any port, socket, or connection point for the computing device with the specific type of port, socket, or connection being based on the type and functionality of the computing device. In other embodiments, the port may be a more general opening into the housing 20 or a recess in an exterior surface of the housing 20.

As illustrated in FIG. 10, the housing 20 includes an opening 108 in communication with the compartment 104 and through which the port 106 extends. The port 106 may be coupled to the housing 20 in a manner that provides suitable ingress protection; however, elements of the port 106 (e.g., pins or contacts) may remain exposed. Accordingly, a cover 200 may be provided with the housing 20 to cover the port 106 when the port 106 is not in use, thereby protecting any exposed components of the port 106 from dust, fluids, and debris. Similarly, when the port 106 is instead a more general opening into the housing 20 or a recess defined on the exterior surface of the housing 20, the cover 200 may be used to prevent dust, fluid, etc. from entering the housing 20 or recess.

Figure 11:
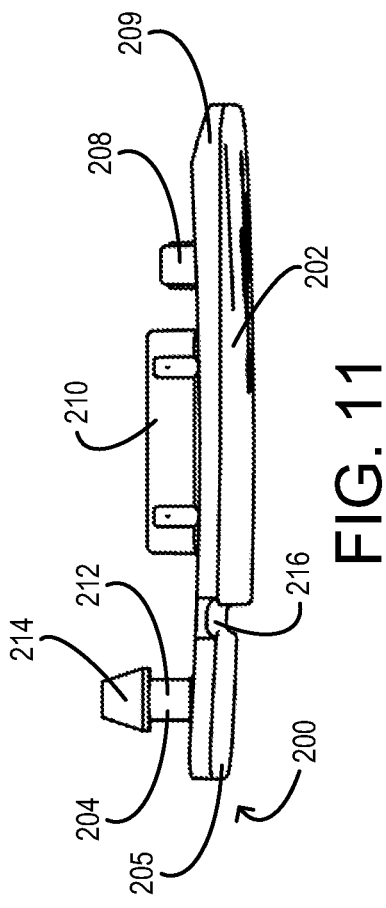
FIG. 11 is a top view of a cover of the computer housing of FIG. 3.

Referring to FIG. 11, in certain embodiments, the cover 200 may include a cover body 202 from which multiple protrusions may extend. For example, the cover 200 includes a retention protrusion 204 extending from a first portion 205 of the cover body 202 and a closure protrusion 208 disposed on a second portion 209 of the cover body 202. When used to cover the port 106, the retention protrusion 204 is inserted into a retention channel 80 (shown in FIG. 10) through a primary retention channel opening 81 and the closure protrusion 208 is inserted into a closure recess 82 (also shown in FIG. 10) such that the cover body 202 extends across and covers the port 106. The cover 200 may further include a flange 210 shaped to be inserted into the opening 108, thereby providing improved sealing and retention of the cover 200. The retention channel 80 is generally isolated from the compartment 104 such that the retention channel 80 does not provide an additional opportunity for ingress into the compartment 104.

In at least certain embodiments, the cover 200 is formed from a flexible material, such as, but not limited to, silicone rubber. In certain implementations, flexible materials enable at least partial deformation of the cover 200 during use and, as a result, generally provide better sealing and retention than more rigid materials. For example, flexible materials may allow the flange 210 to deform when inserted into the opening 108 such that the flange 210 forms an interference fit with the opening 108. Nevertheless, this disclosure contemplates any suitable material or combination of materials (e.g., a rigid body with one or more flexible gaskets) for forming the cover 200.

Figure 13:
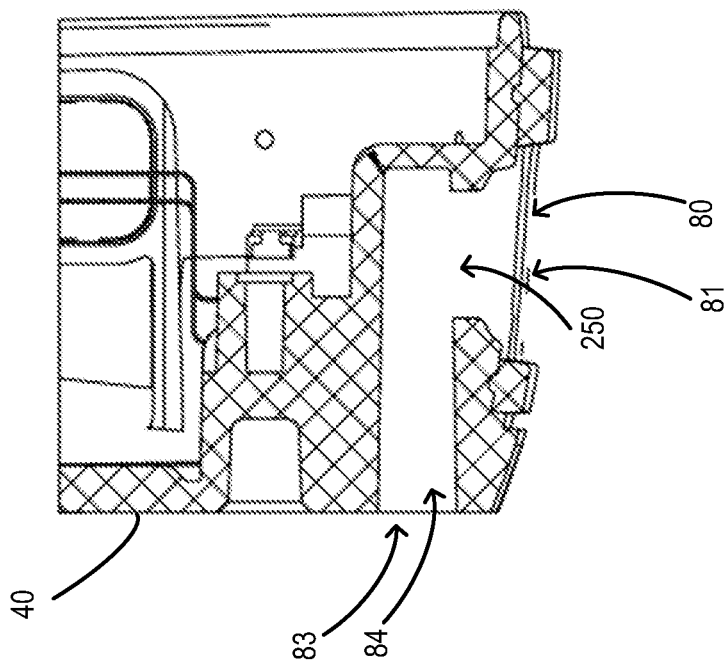
FIG. 13 is a partial cross-sectional view of the computer housing of FIG. 3 without a cover.
Figure 12:
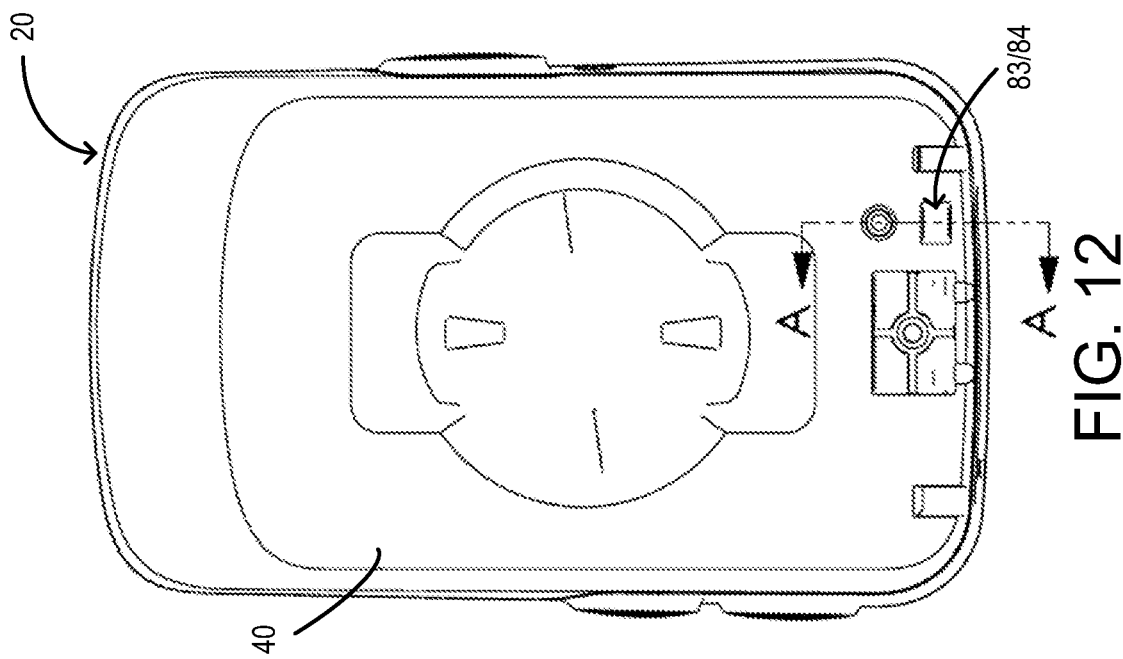
FIG. 12 is a bottom view of the computer housing of FIG. 3 without a cover.
Figure 15:
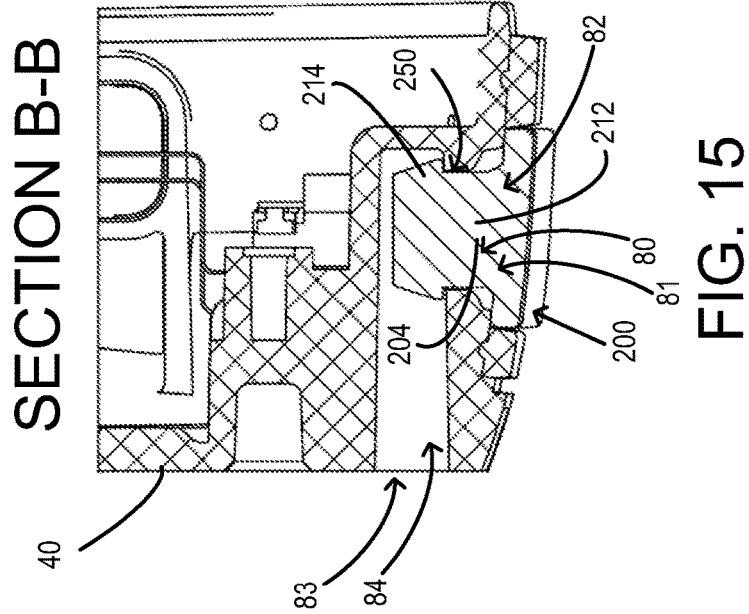
FIG. 15 is a partial cross-sectional view of the computer housing of FIG. 3 without a cover.
Figure 14:
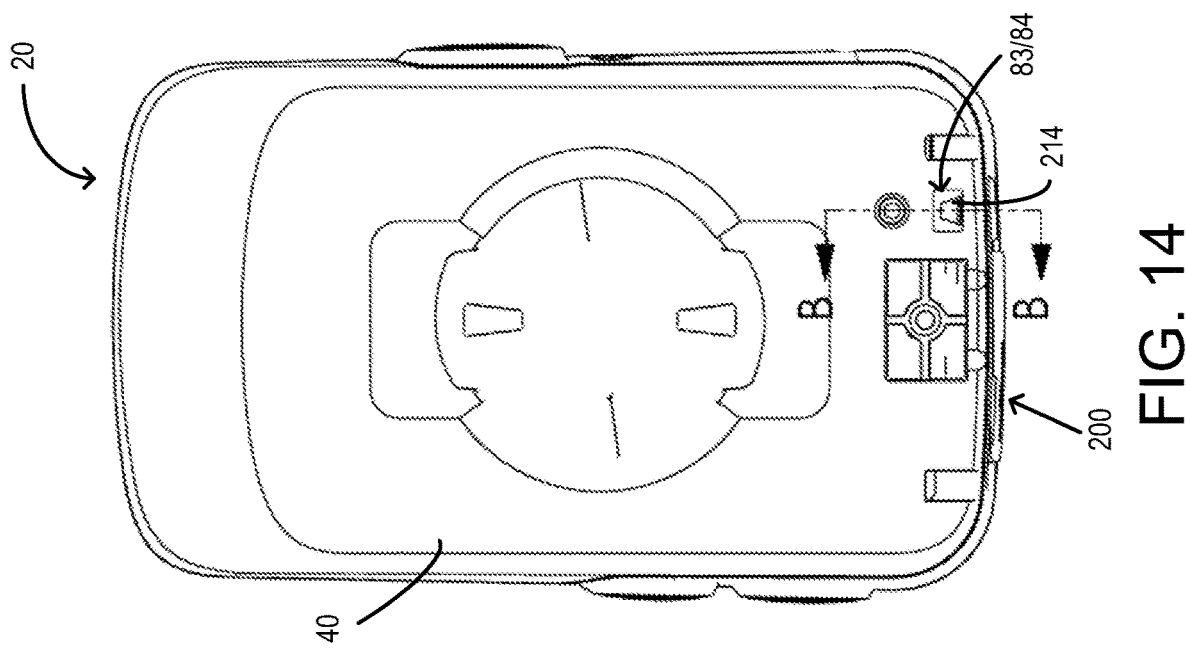
FIG. 14 is a bottom view of the computer housing of FIG. 3 including a cover.

As illustrated, the retention protrusion 204 includes a stem 212 and a tip 214. During use and with reference to FIGS. 12 and 13 (which are a bottom view and partial cross-sectional view of the housing 20, respectively, with the cover 200 omitted) and FIGS. 14 and 15 (which are a bottom view and partial cross-sectional view of the housing 20, respectively, including the cover 200), the stem 212 and the tip 214 are inserted into the retention channel 80 through the primary retention channel opening 81 such that the tip 214 passes through and is retained by an aperture 250 defined within the retention channel 80. The aperture 250 separates a first portion 82 of the retention channel 80 from a second portion 84 of the retention channel 80 and has smaller cross-sectional dimensions than those of the tip 214. As a result, the tip 214 is compressed/deformed as it passes through the aperture 250. After passing through the aperture 250, the tip 214 returns to its original shape and is retained within the second portion 84 of the retention channel 80 by virtue of the tip 214 having a larger maximum cross-sectional area than the aperture. For example, in the specific embodiment of FIGS. 14 and 15, the tip 214 has a frusto-conical shape in which a diameter of a top of the tip 214 is smaller than a diameter of the aperture 250 (thereby facilitating insertion of the tip 214 through the aperture 250) and a diameter of the base of the tip 214 is larger than the diameter of the aperture 250 (thereby improving retention after the tip 214 has been inserted through the aperture 250).

Referring back to FIGS. 10 and 11, once the cover 200 is coupled to the housing 20 by inserting the retention protrusion 204 into the retention channel 80, the closure protrusion 208 may be used to cover and uncover the port 106 without decoupling the cover 200 from the housing 20. For example, when the port 106 is covered, the closure protrusion 208 may be inserted into the closure recess 82 and retained within the closure recess 82 by an interference or press fit. The fit of the closure protrusion 208 within the closure recess 82 may be such that retention of the closure protrusion 208 within the closure recess 82 is less than retention of the retention protrusion 204 within the retention channel 80. As a result, the closure protrusion 208 may be removed from the closure recess 82 without removing the retention protrusion 204 from the retention recess 80 and access to the port 106 may be provided by bending, rotating, or otherwise manipulating the cover body away from the port 106. As illustrated in FIG. 11, the cover body 202 may include a hinge (e.g., living hinge 216 disposed between the first portion 205 and the second portion 209 of the cover body 202) or similar structure to facilitate movement of the cover body 202 away from the port 106 while maintaining the retention protrusion 204 within the retention channel 80.

The cover 200 of FIG. 11 is an illustrative example only and other cover configurations are contemplated by this disclosure. For example, the cover 200 may be configured to cover multiple ports. As another example, the cover 200 may omit the closure protrusion 208 (e.g., by relying instead on a press or interference fit between the cover body 202 and walls of a recess within which the port 106 is disposed). As yet another example, the cover 200 may include more than one retention-style protrusion. The cover 200 is also not limited to any specific size or shape. Rather, covers contemplated by this disclosure may be sized and shaped to accommodate any port or opening of a housing or container.

In certain instances, and as shown in FIG. 16, the tip 214 of the retention protrusion 204 may shear off the stem 212 of the protrusion and remain disposed within the second portion 84 of the retention channel 80. For example, repeated insertion and removal of the retention protrusion 204 through the aperture 250 may cause the tip 214 to shear or otherwise break off of the stem 212. In such cases, the broken tip 214 typically must be removed from within the retention channel 80 before another cover may be used. Removal of the tip 214 by way of the primary opening 81 of the retention channel 80 may be extremely difficult or not possible due to the relative dimensions of the tip 214 and the aperture 250. To address this issue, the housing 20 further defines a secondary opening 83 of the retention channel 80 that is in communication with the second portion 84 of the retention channel 80 and that is generally sized and shaped to facilitate easy removal of the tip 214 if the tip 214 breaks off within the retention channel 80, as indicated by arrow 252.

As illustrated in FIGS. 12-16, the secondary opening 83 may be disposed on the bottom surface 44 of the housing 20 and, as a result, is oriented perpendicular to the primary opening 81 of the retention channel 80. Accordingly, if and when the tip 214 of the retention protrusion 204 shears off of its stem, the tip 214 may be readily removed via the secondary opening 83. If the size and shape of the secondary opening 83 are sufficient, the tip 214 may simply fall out of the retention channel 80 by gravity when the secondary opening 83 is made to face downward. Removal of the tip 214 may also be facilitated by shaking, bumping, etc. the housing 20 and/or by the insertion of a tool or other object into the retention channel 80 through the secondary opening 83.

The secondary opening 83 and the second portion 84 of the retention channel 80 are not limited to any specific shape or size; however, in general, the secondary opening 83 may have a shape and the second portion 84 may have a cross-sectional shape that accommodate the maximum dimensions of the tip 214 to facilitate easy removal of the tip 214. For example, the secondary opening 83 may generally define a normal 88 and the shape of the secondary opening 83 and the cross-sectional shape of the second portion 84 may be such that they accommodate the maximum cross-sectional dimensions of the tip 214 perpendicular to the normal 88 when the tip 214 is oriented in the position in which it is likely to break off within the retention channel 80. So, for example, in the embodiment of FIG. 16, the width of each of the secondary opening 83 and the cross-section of the second portion 84 of the retention channel 80 may exceed the maximum width of the tip 214, which, in the case of the frustoconical shape of the tip 214, corresponds to the width at the base of the tip 214. Similarly, the height of each of the secondary opening 83 and the cross-section of the second portion of the retention channel 80 may exceed the maximum height of the tip 214. Accordingly, it should be appreciated that the size and shape the secondary opening 83 and the second portion 84 of the retention channel 80 may be readily adapted to accommodate a wide range of tip shapes and sizes and that, as a result, this disclosure is not limited to implementations including only frustoconically shaped protrusions.

Although the second portion 84 and the secondary opening 83 of the retention channel 80 are illustrated in the figures as being perpendicularly oriented relative to the first portion 82 and first opening 81 of the retention channel 80, in other embodiments, non-perpendicular arrangements may be possible depending on the size and shape of the tip 214 of the retention protrusion 204. Moreover, while illustrated as opening to the bottom surface 40 of the housing 20, the secondary opening 83 may instead be disposed on the front or side surfaces of the housing 20 with the second portion 84 of the retention channel 80 routed accordingly and each of the second portion 84 and the secondary opening 83 sized and shaped to accommodate the corresponding orientation of the tip 214.

Although discussed in the context of a cycling computer and although the cover design described herein is particularly useful for cycling computers due to the prevalence of dirt, fluid, and other debris in cycling, the concepts disclosed herein are not limited to cycling computer applications. Rather, the retention channel and related concept discussed herein may be implemented in any computing device or, even more broadly, in any housing or container. Moreover, while this disclosure focuses primarily on applications related to covers for computing device ports, the retention channel and related concepts discussed herein may be more broadly applied to any port, opening, recess, or similar structure that may require or generally benefit from being covered.

As indicated above, the retention channel and related aspects of the present disclosure has been described herein in terms of preferred embodiments and methodologies considered by the inventor to represent the best mode of carrying out the invention. It will be understood by the skilled artisan, however, that a wide range of additions, deletions, and modifications, both subtle and gross, may be made to the illustrated and exemplary embodiments of the cycling computer without departing from the spirit and scope of the invention. These and other revisions might be made by those of skill in the art without departing from the spirit and scope of the invention that is constrained only by the following claims.

What is claimed is:

1. A computing device comprising:
 a housing defining a compartment containing electronic components and a channel extending through the housing and isolated from the compartment, wherein the channel includes each of a first portion shaped to receive a protrusion of a cover through the first portion to couple the cover to the housing, a second portion including an opening to an exterior of the housing, and an aperture between the first portion and the second portion,
 wherein, when the protrusion is received by the channel, a tip of the protrusion is disposed within the second portion and retained by the aperture, and
 wherein, when the tip is decoupled from the protrusion, the opening permits access to and removal of the tip from the second portion, the opening to the exterior extending transverse to a direction the protrusion is received through the first portion.

2. The computing device of claim 1, wherein the opening has a shape that encompasses maximum cross-sectional dimensions of the tip transverse to the normal.

3. The computing device of claim 1, wherein the electronic components include a port extending from the compartment, through a wall of the housing, and to the exterior of the housing, and wherein, when the cover is coupled to the housing, the cover forms a seal about the port.

4. The computing device of claim 1, wherein the electronic components include a port extending from the compartment, through a wall of the housing, and to the exterior of the housing, wherein, when the cover is coupled to the housing, the cover forms a seal about the port, and wherein the port is a Universal Serial Bus (USB) port.

5. The computing device of claim 1, wherein the first portion includes a first opening defined by the housing, wherein the opening through which the tip is removable is a second opening defined by the housing, and wherein the first opening is oriented transverse to the second opening.

6. The computing device of claim 1, wherein the housing further defines a compartment opening extending from the compartment to the exterior of the housing, wherein the compartment opening is covered by the cover when the cover is coupled to the housing, and wherein the housing further defines one of a recess disposed on an opposite side of the compartment opening from the channel.

7. A housing comprising:
 a housing body defining a compartment and a channel extending through the housing body and isolated from the compartment, wherein the channel includes each of a first portion shaped to receive a protrusion of a cover through the first portion to couple the cover to the housing body, a second portion including an opening to an exterior of the housing body, and an aperture between the first portion and the second portion,
 wherein, when the protrusion is received by the channel, a tip of the protrusion is disposed within the second portion and retained by the aperture, and
 wherein, when the tip is decoupled from the protrusion, the opening permits access to and removal of the tip from the second portion, the opening to the exterior extending transverse to a direction the protrusion is received through the first portion.

8. The housing of claim 7, wherein the opening has a shape that encompasses maximum cross-sectional dimensions of the tip transverse to the normal.

9. The housing of claim 7, wherein the first portion includes a first opening defined by the housing body, wherein the opening through which the tip is removable is a second opening defined by the housing body, and wherein the first opening is oriented transverse to the second opening.

10. The housing of claim 7, wherein the housing body further defines one of a recess disposed on an opposite side of the opening from the channel.

11. A cycling computer comprising:
 a housing defining a compartment and a channel extending through the housing and isolated from the compartment, wherein the channel includes each of a first portion shaped to receive a protrusion of a cover through the first portion to couple the cover to the housing body, a second portion including an opening to an exterior of the housing, and an aperture between the first portion and the second portion; and a computing device disposed within the housing, the computing device including a port extending through a port opening defined by the housing to an exterior of the housing, wherein, when the protrusion is received by the channel, a tip of the protrusion is disposed within the second portion and retained by the aperture, and wherein, when the tip is decoupled from the protrusion, the opening permits access to and removal of the tip from the second portion, the opening to the exterior extending transverse to a direction the protrusion is received through the first portion.

12. The cycling computer of claim 11, wherein the opening has a shape that encompasses maximum cross-sectional dimensions of the tip transverse to the normal.

13. The cycling computer of claim 11, wherein, when the cover is coupled to the housing, the cover forms a waterproof seal about the port opening.

14. The cycling computer of claim 11, wherein the port is a Universal Serial Bus (USB) port.

15. The cycling computer of claim 11, wherein the first portion includes a first opening defined by the housing, wherein the opening through which the tip is removable is a second opening defined by the housing, and wherein the first opening is oriented transverse to the second opening.

16. The cycling computer of claim 11 further comprising a display on a first side of the housing, wherein the opening is disposed on a second side of the housing opposite the first side.

17. The cycling computer of claim 11, wherein the housing further defines one of a recess disposed on an opposite side of the port opening from the channel.

* * * * *